US009727096B1

(12) United States Patent
Truong et al.

(10) Patent No.: US 9,727,096 B1
(45) Date of Patent: Aug. 8, 2017

(54) ALL-IN-ONE WITH SLIDING MECHANISM TO REVEAL REMOVABLE MODULES

(71) Applicant: Lenovo (Singapore) Pte. Ltd., Singapore (SG)

(72) Inventors: Cuong Huy Truong, Cary, NC (US); Ali Kathryn Ent, Raleigh, NC (US); David Wayne Hill, Cary, NC (US); Cyan Godfrey, Chapel Hill, NC (US); Samuel Jackson Patterson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/019,665

(22) Filed: Feb. 9, 2016

(51) Int. Cl.
*G06F 1/18* (2006.01)

(52) U.S. Cl.
CPC .............. *G06F 1/182* (2013.01); *G06F 1/189* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,815,369 A * | 9/1998 | Quesada | ................... | G06F 1/16 200/292 |
| 6,128,186 A * | 10/2000 | Feierbach | ............. | G06F 1/1613 312/223.3 |
| 6,219,229 B1 * | 4/2001 | Lee | ........................... | G06F 1/18 361/679.08 |
| 6,366,452 B1 * | 4/2002 | Wang | .................... | F16M 11/10 248/125.1 |
| 6,366,453 B1 * | 4/2002 | Wang | ....................... | G06F 1/16 248/917 |
| 6,381,128 B1 * | 4/2002 | Kramer | ................ | G06F 1/1624 312/223.1 |
| 6,680,843 B2 * | 1/2004 | Farrow | ................ | G06F 1/1601 361/679.02 |
| 7,145,767 B2 * | 12/2006 | Mache | ................ | F16M 11/046 361/679.21 |
| 7,471,511 B2 * | 12/2008 | Montag | ................ | G06F 1/1601 348/730 |
| 7,715,180 B2 * | 5/2010 | Titzler | .................. | G06F 1/1601 312/223.2 |
| 8,144,452 B2 * | 3/2012 | Huang | ................... | G06F 1/181 361/679.02 |
| 8,199,483 B2 * | 6/2012 | Ji | .......................... | G06F 1/1601 361/679.39 |
| 8,210,548 B1 * | 7/2012 | Agyemang | ............ | A61B 50/13 280/47.35 |
| 8,537,532 B2 * | 9/2013 | Chen | ..................... | G06F 1/1601 248/917 |

(Continued)

*Primary Examiner* — Lisa Lea Edmonds
(74) *Attorney, Agent, or Firm* — Ference & Associates LLC

(57) ABSTRACT

One embodiment provides an apparatus, including: a housing including: a compartment; the compartment having a panel and two side walls accommodating removable computer modules; the apparatus including a movable component that slides away from the compartment to reveal an inside of the compartment; the compartment including power and data connectors for coupling to the removable computer modules; where power is removed from the removable computer modules responsive to sliding away the movable component. Other aspects are described and claimed.

25 Claims, 6 Drawing Sheets

(56) References Cited

U.S. PATENT DOCUMENTS

| | | | | |
|---|---|---|---|---|
| 9,141,137 B2* | 9/2015 | Chen | ............... | G06F 1/1601 |
| 2006/0055675 A1* | 3/2006 | Wilk | ............... | G06F 1/16 |
| | | | | 345/168 |
| 2006/0290812 A1* | 12/2006 | Hsu | ............... | G06F 1/16 |
| | | | | 348/552 |
| 2007/0247800 A1* | 10/2007 | Smith | ............... | B60R 11/0252 |
| | | | | 361/679.02 |
| 2010/0026912 A1* | 2/2010 | Ho | ............... | H04N 5/64 |
| | | | | 348/836 |
| 2011/0026216 A1* | 2/2011 | Liao | ............... | G06F 1/1601 |
| | | | | 361/679.35 |
| 2011/0235267 A1* | 9/2011 | Zheng | ............... | G06F 1/1601 |
| | | | | 361/679.39 |
| 2013/0010418 A1* | 1/2013 | Flynn | ............... | G06F 1/16 |
| | | | | 361/679.21 |
| 2013/0021747 A1* | 1/2013 | Guan | ............... | G06F 1/1601 |
| | | | | 361/679.47 |
| 2014/0347797 A1* | 11/2014 | Ma | ............... | G06F 1/16 |
| | | | | 361/679.2 |

* cited by examiner

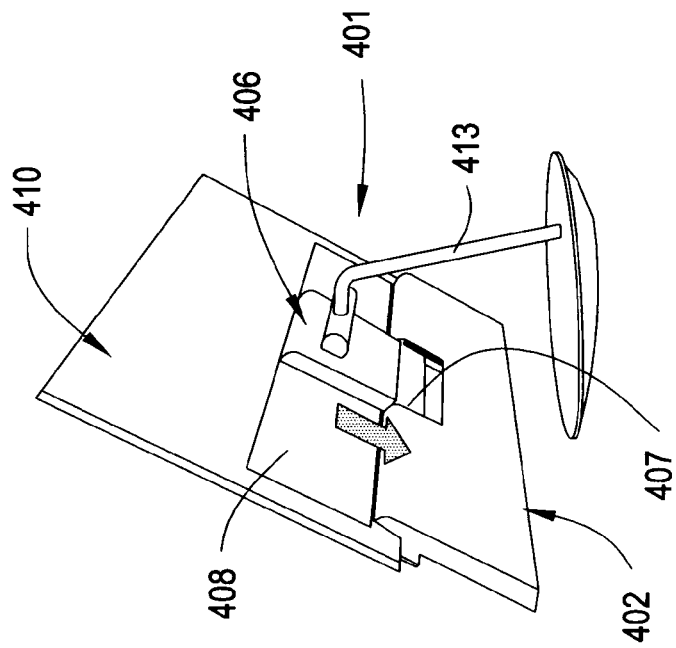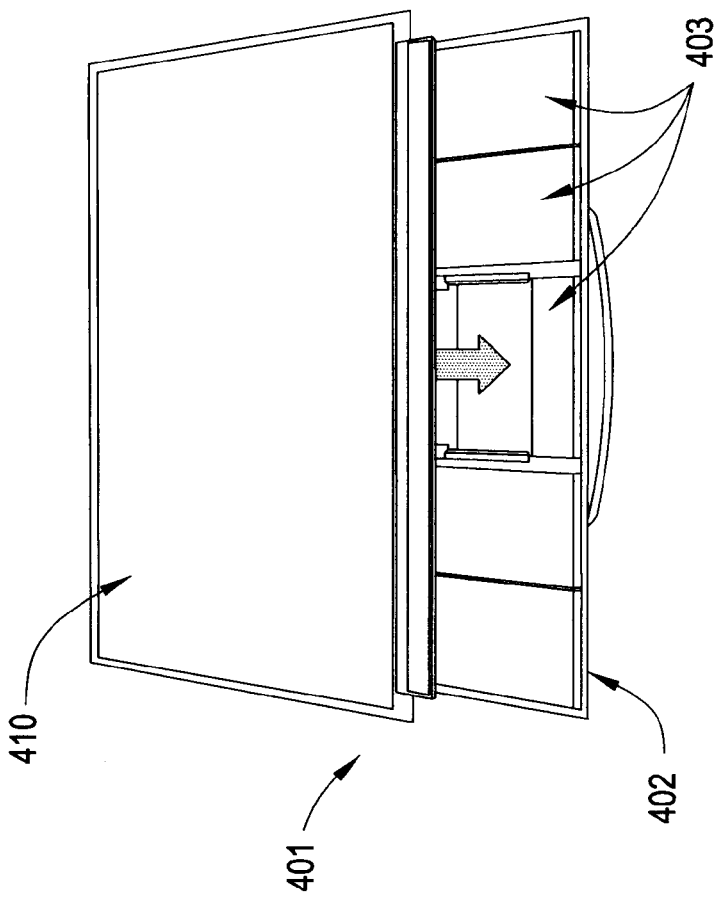
FIG. 4B
FIG. 4A

ALL-IN-ONE WITH SLIDING MECHANISM TO REVEAL REMOVABLE MODULES

BACKGROUND

Information handling devices (e.g., desktop computers, laptop computers, etc., "devices") allow users to accomplish a variety of tasks. One such device, an All-In-One ("AIO") computer integrates a computer system's internal components (e.g., battery, hard drive, memory processor, fan, etc.) into the same case as the display, thereby occupying a smaller space than a traditional desktop with a large hardware tower. However, AIOs are difficult to service and many users experience difficulties when attempting to access and remove a particular hardware component. This can lead to user frustration due to the time and effort it takes to remove a single component. Therefore, it would be desirable if the internal components of an AIO were easily accessible by a user.

BRIEF SUMMARY

In summary, one aspect provides an apparatus, comprising: a housing including: a compartment; said compartment having a panel and two side walls accommodating a plurality of removable computer modules; said apparatus including a movable component that slides away from the compartment to reveal an inside of the compartment; said compartment including a plurality of power and data connectors for coupling to the plurality of removable computer modules; wherein power is removed from the plurality of removable computer modules responsive to sliding away the movable component.

Another aspect provides a system, comprising: a plurality of removable computer modules; and a housing including: a compartment; said compartment having a panel and two side walls accommodating the plurality of removable computer modules; said apparatus including a movable component that slides away from the compartment to reveal an inside of the compartment; said compartment including a plurality of power and data connectors for coupling to the plurality of removable computer modules; wherein power is removed from the plurality of removable computer modules responsive to sliding away the movable component.

A further aspect provides an apparatus, comprising: a housing including: a fixed portion; and a movable compartment; said movable compartment having a panel and two side walls; said side walls contacting the fixed portion and permitting the movable compartment to slide away from the fixed portion; said bottom panel including a plurality of power and data connectors for coupling to a plurality of removable computer modules.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates an example view of a sliding compartment of an all-in-one dock containing various modules.

DETAILED DESCRIPTION

Figure 1:
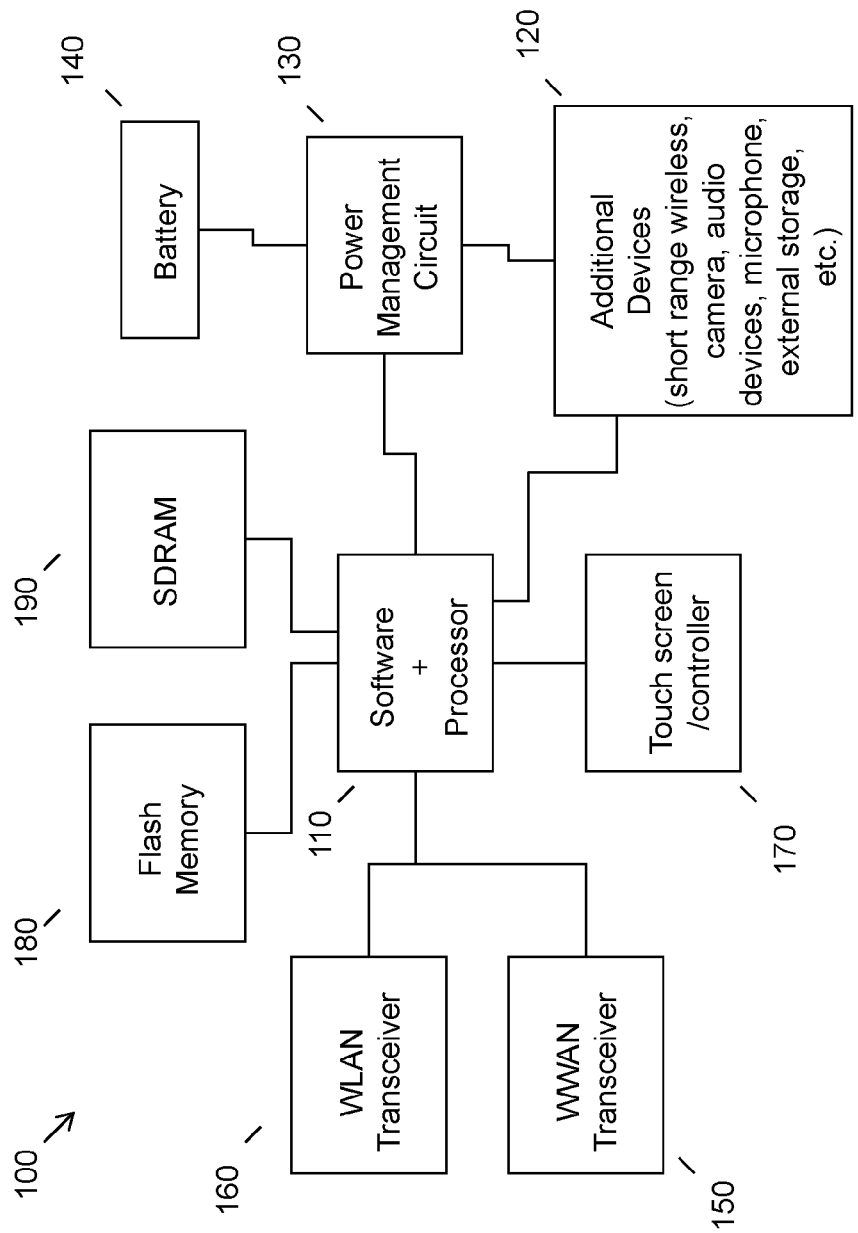
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One current device that assists in ease-of-use is an All-In-One ("AIO") computer. An AIO integrates the system's internal components (e.g., battery, hard drive, memory, processor, fan, etc.) into the same case as the display, thus occupying a smaller footprint than desktops that incorporate a tower. However, these are difficult to service. Like laptops, some AIO desktop computers are characterized by an inability to customize or upgrade internal components. The systems' cases do not provide convenient access to upgradable components; therefore, faults in certain aspects of the hardware may require the entire computer to be replaced, regardless of the health of its remaining components.

These technical problems present difficulties for users in that exchanging a failing component or expanding the functionality, storage or other capability of an AIO. A conventional solution would be to disconnect the AIO and turn it around so that a back panel is facing the user. From this position a user can use tools to remove, upgrade, or repair an existing part. However, typically many of the components in these designs are closely packed together so it is difficult to remove and service an individual component. In addition, conventional techniques do not allow the user to service an AIO from the front. Therefore, a user may waste a great deal of time and energy trying to remove a single component. These issues are especially prevalent for those who need to frequently remove certain components as a course of business. For example, many people involved with finance are required to remove their hard drives on a daily basis. Having an AIO is not necessarily ideal because they are unable to quickly remove their hard drive without first struggling to open their computer and gain access to the hard drive module.

Accordingly, an embodiment provides a device that allows for easy access to AIO computer components. In an embodiment, a user can easily access and remove a desired component without having to struggle to remove any paneling. In an embodiment, a compartment that houses internal modules is situated behind the display panel when closed. The compartment can be accessed from the front of the monitor and can be pulled down on one or more tracks to reveal the internal modules behind the screen. In an embodiment, the component access can be tool-less or a physical locking can be actuated, e.g., if required for security.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen or touch surface 170 for data input and display/rendering. System 100 also typically includes various memory devices, for example flash memory 180 and SDRAM 190.

Figure 2:
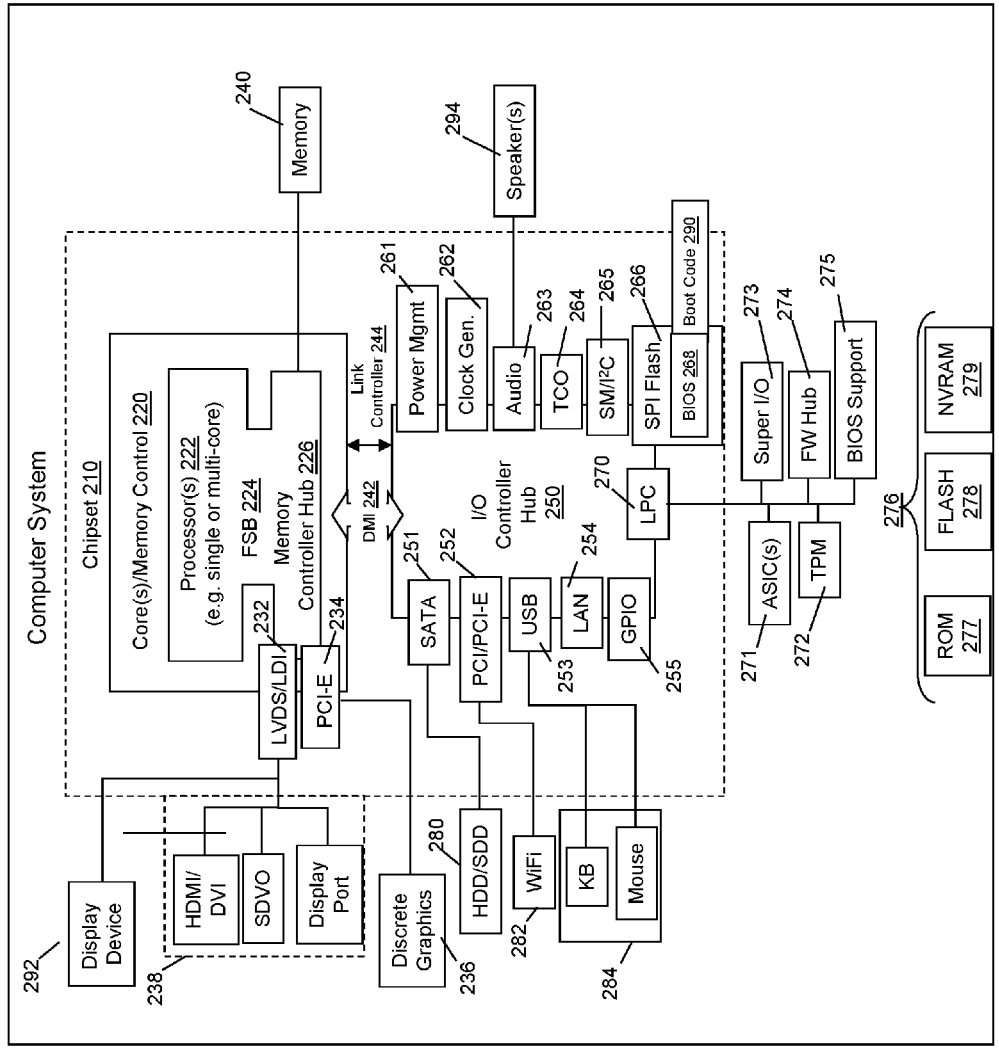
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Device circuitry, as for example outlined in FIG. 1 or FIG. 2, may be used in AIO devices that have been modularized. As further described herein, the circuitry outlined in FIG. 1 and/or FIG. 2, or a suitable combination thereof, may be included in one or more removable modules of an AIO of an embodiment. Furthermore, device circuitry, e.g., such as that outlined in FIG. 1, may included in a display panel or monitor, e.g., if the display panel or monitor is formed as a tablet computing device. Alternatively, an embodiment may include a monitor that has reduced circuitry, e.g., a circuit board and a power and data connection to a dock or housing, as further described herein.

Figure 3:
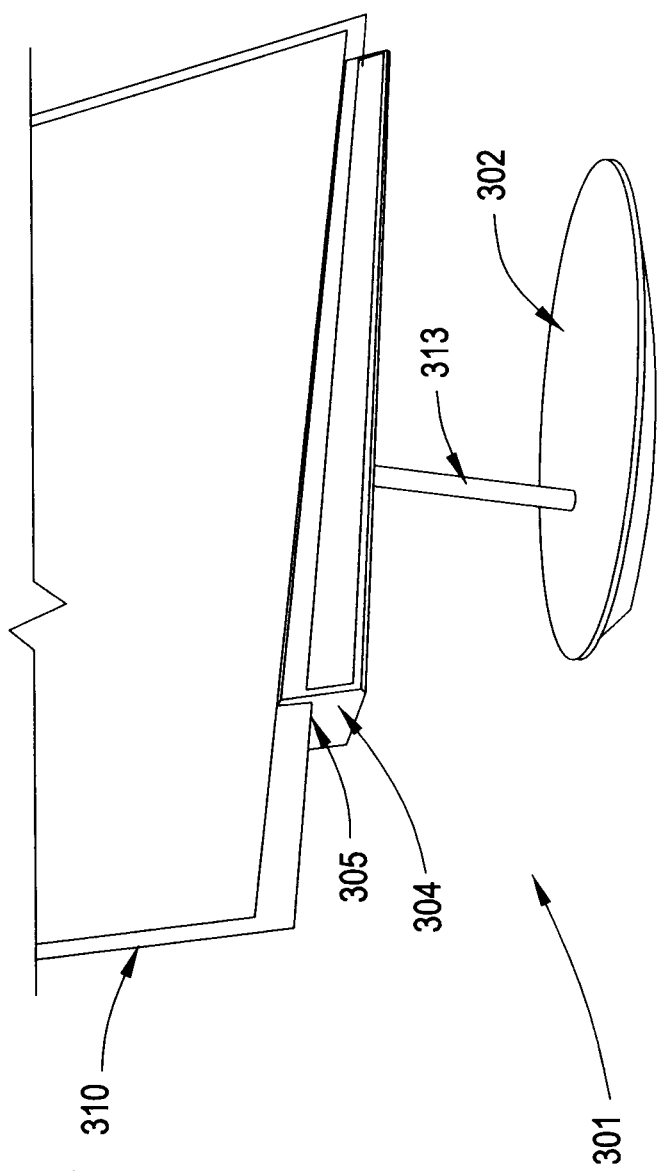
FIG. 3 illustrates an example of a display attached to an all-in-one dock.

Referring now to FIG. 3, an embodiment may comprise an AIO 301 having a base 302, an arm 313, and a dock 304. The base 302 may provide weighted balance for the dock 304 and is connected to the dock 304 by the arm 313. In an embodiment, the dock 304 may contain a trough or tray 305 in which monitor screen(s) or display panel(s) 310 of varying sizes can be inserted and electrically connected to the dock 304. The dock 304 may for example include a male power and data connector onto which a female port of a display panel is fitted. Moreover, the dock 304 may include other components, e.g., audio speakers, etc.

Referring now to FIG. 4(A-B), in an embodiment, the AIO 401 may include fixed portion 408 of the housing and a compartment 402 that moves with respect to the fixed portion 408. The compartment 402 houses various computer components. In an embodiment, the computer components are built into cartridge-like casings or modules 403. In an embodiment, the compartment 402 housing the various modules 403 may be situated behind the monitor or display panel 410. In an embodiment, the compartment 402 may be a sliding compartment 402, which can be easily pulled down by a user. When the sliding compartment 402 is pulled down, a user may have frontal access to the various modules 403. The modules 403 may feature tool-less removal. The compartment 402 may slide or move along tracks provided by the fixed portion 408, much as a drawer slides out from a housing.

In an embodiment, the arm 413 is mounted to circuitry unit 406 located on the back of the AIO 401. In an embodiment, the circuitry unit 406 includes circuitry to operatively couple the modules 403 in the compartment 402 with one another and with a display panel 410. In an embodiment, at least one connection or contact interface 407 is located on the compartment 402 and such that the compartment 402, in the upward or closed position, contacts a corresponding connection or contact in the bottom of the circuitry unit 406. This permits the compartment 402 and the circuitry unit 406 to operatively engage and provide power and data connectivity to and/or between the modules 403 and other components when the compartment 402 is slid up into the connected position. When the compartment 402 is pulled down, the electrical connections disengage. Therefore, when the compartment 402 is in the disconnected ("bottom") position, no power is being supplied to the modules 403 in the compartment 402.

In an embodiment, the display panel 410 may be removed from the dock of the AIO 401, for example via being lifted up and away from trough or tray 305, thus exposing the modules 403 for removal. In an embodiment, a connection, e.g., such as contact interface 407, may be located such that removal of a display panel 410, in addition to or in lieu of movement of the compartment 402, acts to remove or disconnect power from the modules 403. In an embodiment, the compartment 402 may move in addition to a removable display panel 410 to offer another mechanism to expose the modules 403. In an embodiment, the display panel 410 may be integrated into the dock, i.e., not removable.

In an embodiment, the fixed portion 408 of the AIO 401 located between the modules 403 in the compartment 402 and the back of the monitor display 410 is comprised of a shielding material, such as electromagnetic interference ("EMI") shielding material.

Figure 5A:
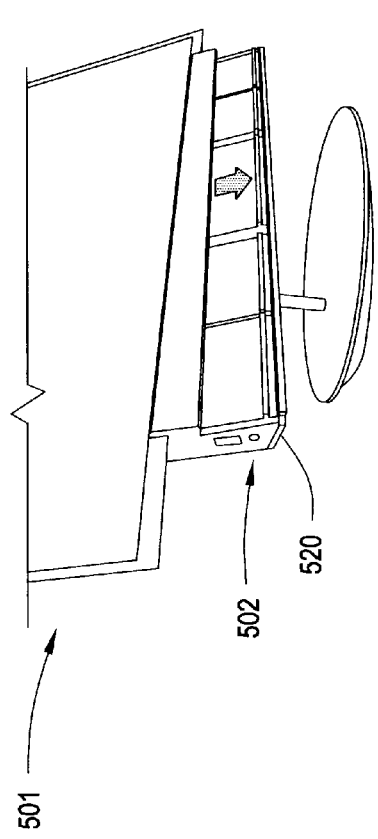
FIG. 5(A-B) illustrates another example view of a sliding compartment of an all-in-one dock containing various modules.
Figure 5B:
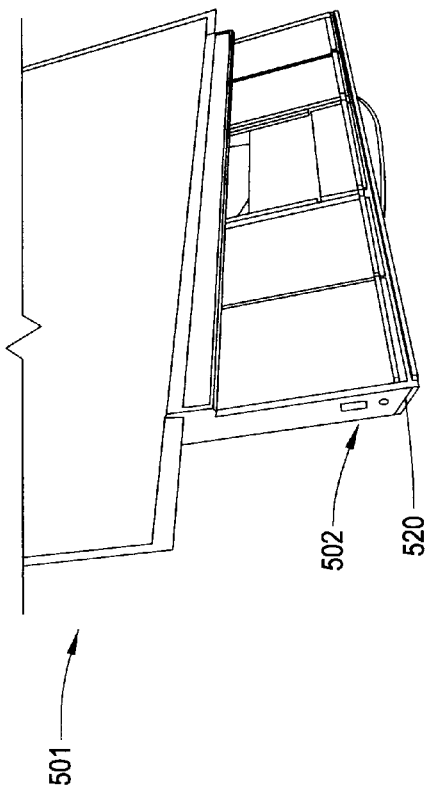

Shown in FIG. 5(A-B) is a sliding motion of a compartment 502 of the AIO 501. In an embodiment, the compartment 502 may be positioned on nesting sliders, similar to those used in traditional pull out drawers, on which the compartment 502 is able to smoothly slide up and down. On the bottom portion of the sides of the compartment 502 are ridges 520 that the user may grab to pull the compartment 502 downward. In an embodiment, the ridges 520 may be highlighted in red or otherwise visually distinguished to be easily visible to a user. FIG. 5A illustrates an example configuration of a compartment 502 during the compartment's 502 downward motion to the bottom position. FIG. 5B illustrates an example configuration of a compartment 502 in its bottom position.

Figure 6:
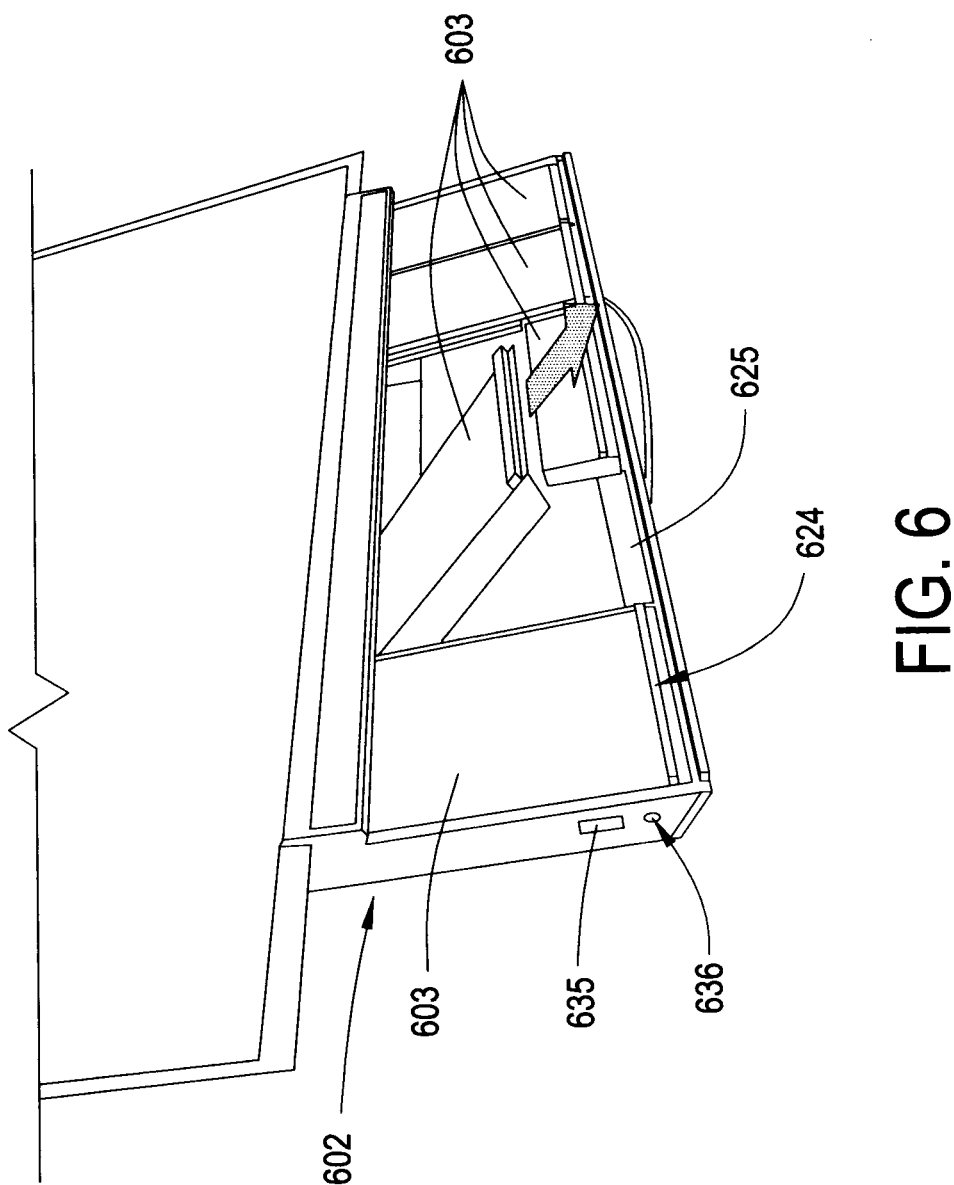
FIG. 6 illustrates an example view of one of the modules of the sliding compartment being removed.

Referring now to FIG. 6, in an embodiment, the modules 603 can be connected to a bottom panel 625 of the sliding compartment 602. The bottom panel 625 of the sliding compartment 602 may include a daughter board that provides connectors for the modules 603. In an embodiment, each module 603 has a designated spot on the bottom panel 625. In the example shown in FIG. 6, modules 603 are ordered (from left to right) in the compartment 602 as a battery module, a hard drive module, a memory module, a processor module, and a fan module.

In an embodiment, a user may easily remove a desired module 603 from the compartment 602 once the compartment 602 is slid into its bottom or downward position by lifting the module 603 upwards and away from the bottom panel 625. Each module 603 may include a raised lip 624, e.g., running horizontally across the bottom portion of the module 603, so that the module 603 can be pushed up on to disconnect the module 603 from the bottom panel 625 (and circuit board connection) of the sliding compartment 602. In an embodiment, the raised lip 624 may be highlighted (e.g., in red color or otherwise visually distinguished) in order to be easily identifiable to a user. Once the module 603 is disconnected, a user may use their fingers to reach in and pull the module 603 out from the compartment 602.

In an embodiment, referring back to FIG. 4, by virtue of the location of the contact or connection 407 between the circuitry unit 406 and the compartment 402, the modules 603 cannot be removed until all power is cut off to the modules 603 (e.g., the sliding compartment 402 is in the bottom position). This is to ensure that a user does not risk damage to themselves or the modules 603 in the process of removing a module 603 that still has electricity running to it. In an embodiment, only some of the modules 603 are removable. For example, in an embodiment, only the battery and the hard drive modules 603 are removable while the other modules 603 remain fixed. In an embodiment, a power and data port 635, e.g., a USB port, and an audio jack 636 may be located on the side of the sliding compartment 602 and operatively connected to the circuitry unit (406 of FIG. 4).

The various embodiments described herein thus represent a technical improvement to conventional AIO designs. As described herein, an embodiment provides a sliding compartment containing various removable modules. Additionally, rather than having the user struggle to remove a back paneling of an AIO, or possibly have to remove a stand or arm, to remove an individual component or module, an embodiment allows a user to easily access and remove computer components or modules while facing the front of the AIO. While leaving the AIO installed on a stand or arm, a user may even leave cables plugged into the dock, since power is cut to any exposed modules for safety.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   a housing including:
      a compartment;
      a back portion; and
      a front portion comprising a display;
   said compartment having a panel and two side walls accommodating a plurality of removable computer modules;
   said apparatus including a movable component that slides away from the compartment to reveal an inside of the compartment, the inside of the compartment being accessible from the front portion;
   said compartment including a plurality of power and data connectors for coupling to the plurality of removable computer modules;
   wherein power is removed from the plurality of removable computer modules responsive to sliding away the movable component.

2. The apparatus of claim 1, wherein the plurality of removable computer modules comprise a processing module and a battery module.

3. The apparatus of claim 1, wherein:
   the housing comprises a fixed portion; and
   the movable component slides away from the fixed portion.

4. The apparatus of claim 3, wherein the movable component comprises a circuit board and wherein the circuit board is disposed proximate to the panel.

5. The apparatus of claim 3, wherein the fixed portion includes a centrally disposed circuitry unit.

6. The apparatus of claim 5, wherein the centrally disposed circuitry unit comprises at least one contact.

7. The apparatus of claim 6, wherein the movable component comprises at least one contact complimentary to the at least one contact of the centrally disposed circuitry unit.

8. The apparatus of claim 7, wherein the at least one contact of the centrally disposed circuitry unit communicates power and data to at least one module.

9. The apparatus of claim 3, wherein, in an open position, the movable component is slid downward and away from the fixed portion and exposes the plurality of removable computer modules.

10. The apparatus of claim 1, wherein each of the two side walls comprise a ridge disposed at a lower edge thereof.

11. The apparatus of claim 1, wherein the movable component is a display panel.

12. The apparatus of claim 1, wherein the movable component forms part of the compartment.

13. A system, comprising:
   a plurality of removable computer modules; and
   a housing including:
      a compartment;
      a back portion; and
      a front portion comprising a display;
   said compartment having a panel and two side walls accommodating the plurality of removable computer modules;
   said system including a movable component that slides away from the compartment to reveal an inside of the compartment, the inside of the compartment being accessible from the front portion;
   said compartment including a plurality of power and data connectors for coupling to the plurality of removable computer modules;
   wherein power is removed from the plurality of removable computer modules responsive to sliding away the movable component.

14. The system of claim 13, wherein the plurality of removable computer modules comprise a processing module and a battery module.

15. The system of claim 13, wherein:
   the housing comprises a fixed portion; and
   the movable component slides away from the fixed portion.

16. The system of claim 15, wherein the movable component comprises a circuit board and wherein the circuit board is disposed proximate to the panel.

17. The system of claim 15, wherein the fixed portion includes a centrally disposed circuitry unit.

18. The system of claim 17, wherein the centrally disposed circuitry unit comprises at least one contact.

19. The system of claim 18, wherein the movable component comprises at least one contact complimentary to the at least one contact of the centrally disposed circuitry unit.

20. The system of claim 19, wherein the at least one contact of the centrally disposed circuitry unit communicates power and data to at least one module.

21. The system of claim 15, wherein, in an open position, the movable component is slid downward and away from the fixed portion and exposes the plurality of removable computer modules.

22. The system of claim 13, wherein each of the two side walls comprise a ridge disposed at a lower edge thereof.

23. The system of claim 13, wherein the movable component is a display panel.

24. The system of claim 13, wherein the movable component forms part of the compartment.

25. An apparatus, comprising:
   a housing including:
      a fixed portion;
      a back portion;
      a front portion comprising a display; and
      a movable compartment;
   said movable compartment having a panel and two side walls;
   said side walls contacting the fixed portion and permitting the movable compartment to slide away from the fixed portion to reveal an inside of the movable compartment, the inside of the movable compartment being accessible from the front portion; and a bottom panel including a plurality of power and data connectors for coupling to a plurality of removable computer modules.

\* \* \* \* \*